Aug. 17, 1937.   H. KÜPPENBENDER   2,090,390
PHOTOGRAPHIC CAMERA
Filed March 13, 1937   3 Sheets-Sheet 1
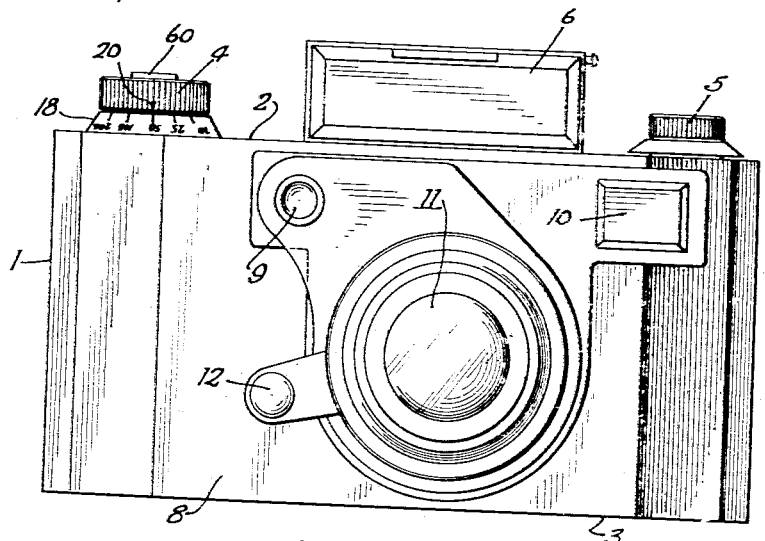
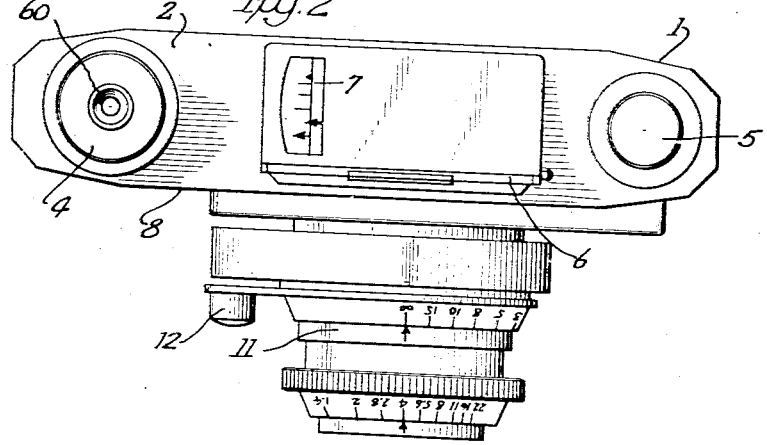
Inventor.
Heinz Küppenbender
by B. Singer
Attorney

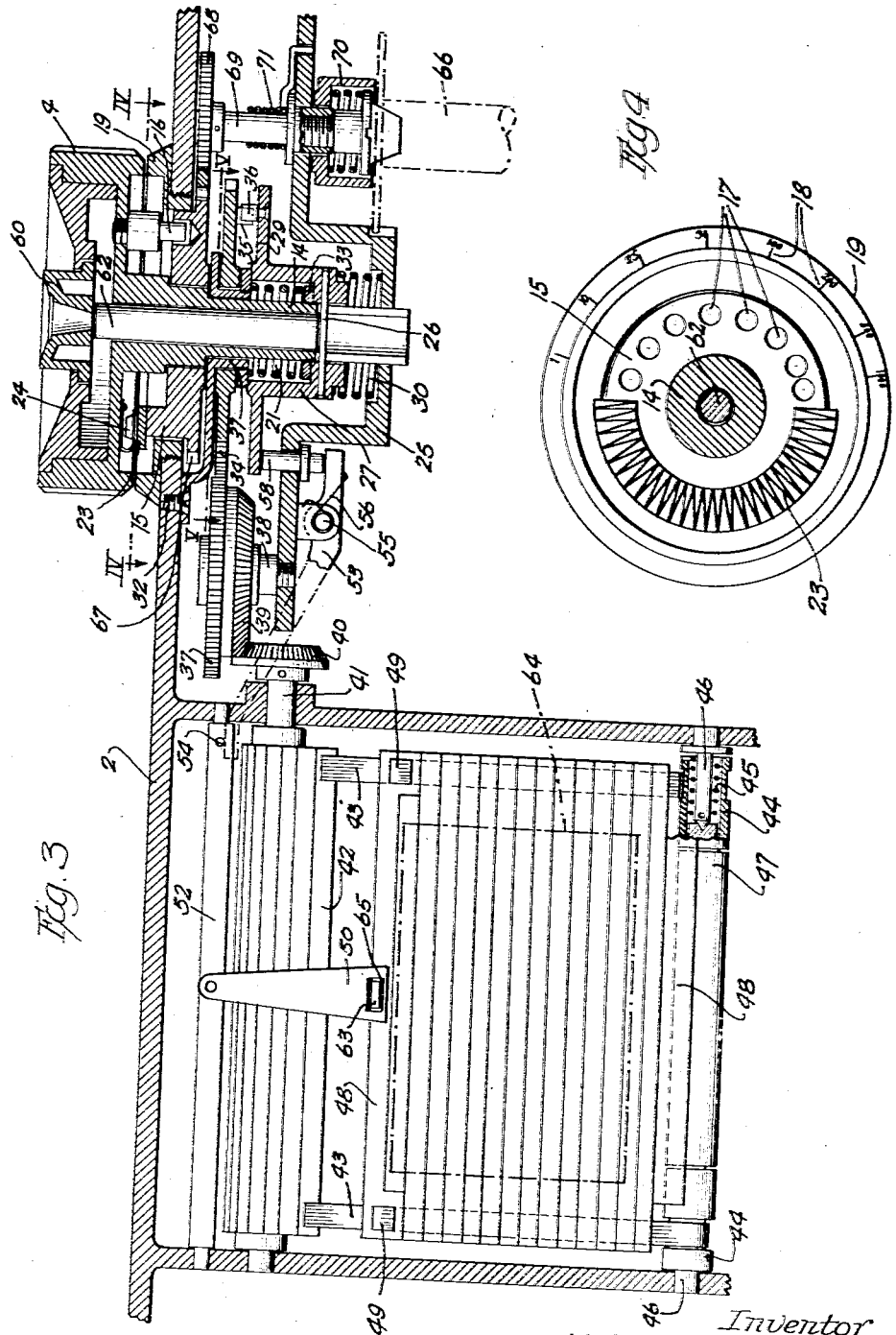

Aug. 17, 1937.  H. KUPPENBENDER  2,090,390
PHOTOGRAPHIC CAMERA
Filed March 13, 1937   3 Sheets—Sheet 3
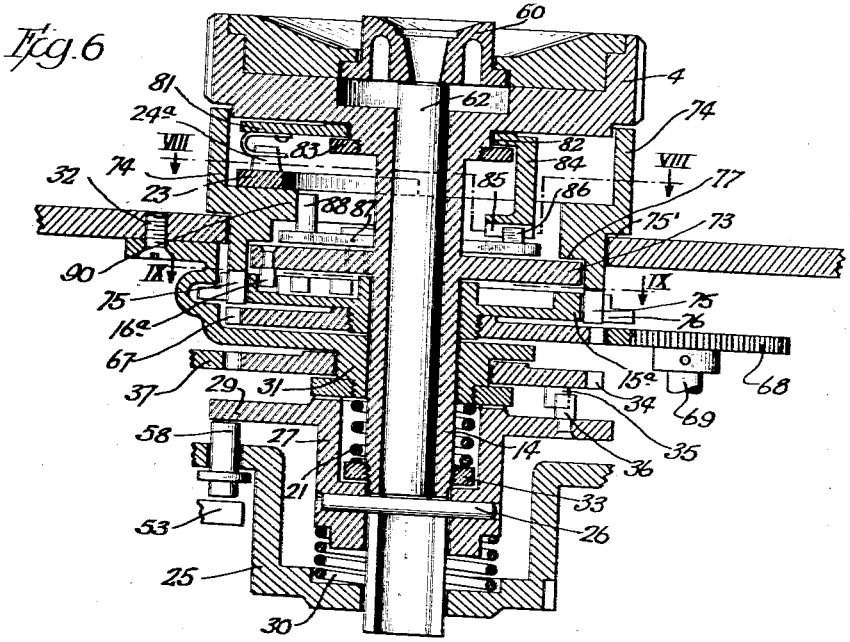
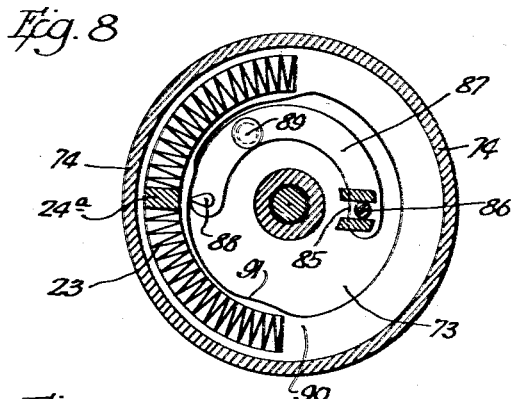
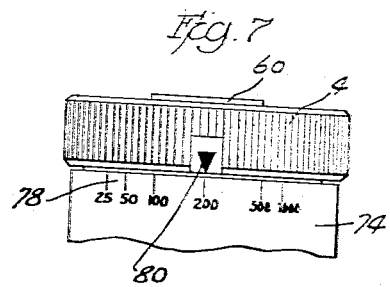
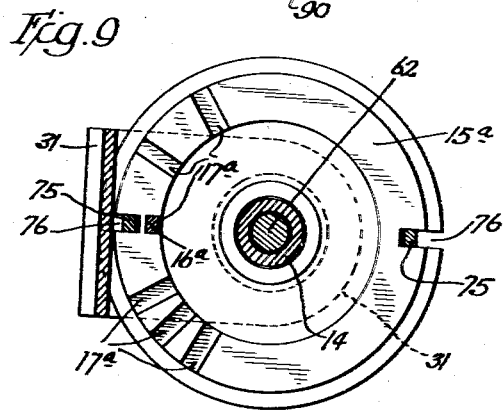
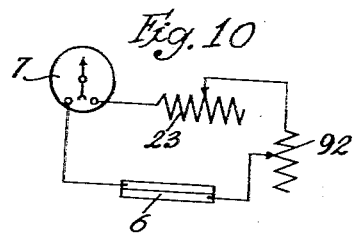
Inventor
Heinz Küppenbender
by B. Singer
Attorney Patented Aug. 17, 1937

2,090,390

UNITED STATES PATENT OFFICE 2,090,390

PHOTOGRAPHIC CAMERA

Heinz Küppenbender, Dresden, Germany, assignor to Zeiss Ikon Aktiengesellschaft, Dresden, Germany Application March 13, 1937, Serial No. 130,703
In Germany November 7, 1935

18 Claims. (Cl. 95—57)

The invention relates to improvements in photographic cameras and in particular relates to a photographic camera provided with a curtain shutter and a photoelectric exposure meter.

It is an object of the invention to couple the slot adjusting member of the curtain shutter with the variable resistance which forms a part of the exposure meter.

Another object of the invention is to provide such a coupling between the slot adjusting member of the curtain shutter and the variable resistance that the slot adjusting member and the shutter tensioning member do not change their relative position to each other when the curtain shutter is tensioned and when it is released. It has been proposed heretofore to obtain this result by arranging a differential gearing between the shutter tensioning member and the curtain slot adjusting member. The present invention eliminates such a differential gearing by mounting the variable resistance of the photoelectric exposure meter coaxial with respect to the shutter tensioning member, between the latter and the curtain slot adjusting member.

A still further object of the invention is to mount the resistance of the photoelectric exposure meter either upon the curtain slot adjustment member or the shutter tensioning member and the slidable contact member which engages the resistance on the other of said two members.

It is also an object of the invention to employ the shutter tensioning member as shutter speed adjusting member.

Another important object of the invention is to provide compensating means in connection with the variable resistance and the shutter operating members whereby the non-uniform angular movements of the shutter speed adjusting member, when being adjusted from one scale division to the next of the ordinarily non-uniform shutter speed scale, are translated into uniform angular movements of the slidable contact member or resistance respectively.

With these and other objects in view the invention is illustrated in the accompanying drawings by way of example; said drawings illustrating two modifications of the invention.

Fig. 1 is a front elevation view of a photographic camera of the present invention.

Fig. 2 is a top plan view of the same.

Fig. 3 shows in an enlarged vertical sectional view the coupling of the shutter tensioning knob with the curtain shutter and the film take-up spool and illustrates the coaxial arrangement of the resistance of the exposure meter with the shutter tensioning knob.

Figs. 4 and 5 are horizontal sectional views on the lines IV—IV and V—V respectively of Fig. 3.

Fig. 6 shows in a view similar to Fig. 3 a modified arrangement of the resistance of the exposure meter.

Fig. 7 is an elevation view of the shutter tensioning knob and the shutter speed scale of the modified embodiment.

Figs. 8 and 9 are horizontal sectional views on the lines VIII—VIII and IX—IX respectively of Fig. 6, and Fig. 10 is a wiring diagram of the exposure meter.

According to Figs. 1 and 2, the camera casing 1 is provided with comparatively narrow top and bottom walls 2 and 3 respectively. At one end of the top wall is arranged the tensioning knob 4 for the curtain shutter and at the other end is arranged the knob 5 for rewinding the film. The knob 4 is not only used for tensioning the shutter but is also employed for adjusting the speed of the shutter. Between these knobs are arranged the photoelectric cell 6 and the measuring instrument 7 of the exposure meter. The front wall 8 of the camera casing 1 is provided with the customary openings 9 and 10 of a base distance meter and also supports an exchangeable lens system 11. The lever 12 is employed for focusing the lens system 11.

According to Fig. 3 the shutter tensioning knob 4 is integrally formed with a tubular shaft 14. A shutter slot adjusting member 15 is loosely mounted upon the tubular shaft 14, but normally is prevented from rotating relatively to the shutter tensioning knob 4 by a pin 16 which is attached to the knob 4 and projects into a bore or socket 17 of the shutter slot adjusting member 15. With reference to Fig. 4, it will be noted that the shutter slot adjusting member 15 is provided with a series of sockets 17 any one of which is adapted to selectively receive the pin 16, depending upon the shutter speed which the photographer desires to employ. According to Fig. 4 each socket 17 corresponds to a certain shutter speed which may be read from a scale 18 arranged on an annular member 19 fixedly attached to the top wall 2 of the camera casing 1 and concentrically to the shutter tensioning knob 4. The knob 4 is provided on its circumference with a mark 20 (Fig. 1) which cooperates with the shutter speed scale 18 on the annular member 19.

When it is desired to adjust the shutter to a certain speed the knob 4 is pulled outwardly against the action of a spring 21 until the pin 16 is withdrawn from its present socket 17. Then the knob 4 is rotated relatively to the member 15 until the pin 16 comes opposite the respective socket 17 coordinated with the desired shutter speed, whence the knob 4 is released to permit the pin 16 to enter the newly selected socket 17.

The resistance 23 of the photoelectric exposure meter is rigidly mounted upon the shutter slot adjusting member 15, while the slidable contact member 24 employed for varying the resistance 23 is secured to the knob 4. If desired, the resistance 23 may be rigidly mounted on the knob 4 and the contact member 24 on the member 15 without changing the result of this adjusting means. It follows from the above description that whenever the shutter speed is varied the resistance 23 is also varied. The resistance 23 remains unaltered, however, during the tensioning and the release of the curtain shutter. As will be described later, whenever the shutter speed is varied the rotative adjustment of the knob 4 relative to the member 15 causes a variation in the size of the slot in the curtain shutter.

The lower end of the tubular shaft 14 extends through a bore of a partition 25 within the camera casing 2 and is slotted upon a portion of its length. A pin 26 passes transversely through the slot of the tubular shaft 14 and through the recessed hub portion 27 of a coupling member 29 which in this manner is slidably mounted upon the tubular shaft 14 and normally is urged by a spring 30 upwardly against a bearing 31. The bearing 31 surrounds the tubular shaft 14 and is fixedly secured to the camera casing at 32. The spring 21 is received by the recess of the hub portion 27 and bears with one end against the bearing 31 and with its other end against a collar 33 secured to the tubular shaft 14. A gear 34 is rotatably supported by the bearing 31 and is provided with a coupling pin 35 adapted to be engaged by a coupling pin 36 on the coupling member 29. Due to the slot-pin connection between the tubular shaft 14 and the coupling member 29 any rotative adjustment between the knob 4 and the member 15 causes a similar adjustment between the two cooperating coupling pins 35 and 36.

The gear 34 meshes with a gear 37 which is rotatable about a stub shaft 38 and is fixedly united with a bevel gear 39. The latter meshes with a bevel gear 40 which is secured to the upper shaft 41 of the curtain shutter. This upper shaft 41 has secured thereto the upper curtain 42. At each side of the upper curtain 42 is attached a carrier ribbon 43 whose opposite ends are attached to rollers 44 provided each with a spring 45. The rollers 44 are rotatably mounted upon stub shafts 46 which at the same time serve as bearing centers for the lower curtain shaft 47. The free end of the lower curtain 48 is attached to the lower curtain shaft 47 while the upper end of the lower curtain 48 is secured to the carrier ribbons 43. The attachment of the lower curtain 48 to the ribbons 43 is effected by buckles 49 through which the ribbons 43 are passed. Therefore the movement of the lower curtain 48 during tensioning of the shutter and also during the release of the same is caused by friction. Above the upper curtain 42 is arranged a holding device 50 for the lower curtain 48. This holding device 50 is secured on a shaft 52 and is operated by a bell crank lever 53 whose major portion is shown in Fig. 3 in dash-dotted lines. This bell crank lever 53 engages a pin 54 on the shaft 52 and is supported by a pivot pin 55. A spring 56 tends to urge the lever 53 in an anti-clockwise direction. A pin 58 which is slidably mounted in the partition 25 rests with its lower end upon the short leg of the bell crank lever 53 and is adapted to oscillate the lever 53 in a clockwise direction to cause a release of the shutter. The upper end of the pin 58 is engaged by the coupling member 29, which is adapted to be pushed downwardly against the action of the spring 30 by the shutter release button 60 loosely mounted in the shutter tensioning knob 4. A push rod 62 loosely mounted within the tubular shaft 14 transmits the movement of the release button 60 to the pin 26 connected with the coupling member 29. Upon pushing the shutter release button 60 downwardly the lever 53 is rotated clockwise and in turn rotates the shaft 52 on which the holding device 50 is secured. The latter is disengaged from a catch 63 on the lower curtain 48. The lower curtain 48 is now released and due to the previously tensioned springs 45 is wound upon the shaft 47. The slot is automatically closed as soon as it has passed over the picture area 64 indicated in Fig. 3 in dotted lines, due to the action of the springs 45. When the shutter is again tensioned by rotating the knob 4 and thereby operating the gearing 34, 37, 39, 40 both curtains 42 and 48 move in closed condition over the picture area 64 until the catch 63 engages the recess 65 of the holding device 50. Thereafter the upper curtain 42 moves alone until the slot between the curtains has reached the desired width corresponding to the adjusted shutter speed. Upon pushing of the release button 60 the same operations are repeated.

When the shutter is tensioned the film is wound upon the take-up spool 66. For this purpose the shutter slot adjusting member 15 is provided with gear teeth 67 meshing with a gear 68 on a shaft 69 connected by means of a friction clutch 70 with the film take-up spool 66. The shaft 69 is surrounded by a spring 71 which permits a rotation of the film take-up means in one direction only.

It is well known now that in curtain shutters of this type the scale divisions of the shutter speed scale 18 are not uniform. In order to obtain now uniform angular adjustments of the slidable contact member 24 when the shutter speed is adjusted from one scale division to the next one, there may be arranged a compensating mechanism between the shutter tensioning knob 4 and the shutter speed adjusting member 15.

The embodiment of the invention illustrated in Figs. 6 to 9 is provided with such a compensating mechanism.

According to Fig. 6 the tubular shaft 14 of the shutter tensioning knob 4 is provided with an intermediate flange 73 axially spaced from the knob 4. This flange 73 has attached thereto a coupling pin 16a similar to the pin 16 of the first embodiment. The coupling pin 16a projects from the lower face of the flange 73 and is adapted to be brought selectively into engagement with a series of recesses 17a arranged in the upper face of the shutter slot adjusting member 15a. Each recess 17a corresponds to a certain shutter speed or a certain width of the shutter slot respectively, and by moving the shutter tensioning knob 4 axially against the action of the spring 21 the pin 16a may be lifted out of its present recess 17a and be inserted into another recess 17a in the same manner as described in connection with Figs. 3 and 4. It will be noted, however, that the resistance 23 of the photoelectric exposure meter is not secured directly to the shutter slot adjusting member 15ª as in the first embodiment, but is secured to an intermediate annular member 74, which is arranged between the knob 4 and the member 15ª and normally rests loosely with an annular shoulder 75' upon the outer face of the camera casing 1. The lower end of this intermediate member 74 extends into the camera casing and is provided with two diametrically opposed coupling teeth 75 which project through corresponding marginal recesses 76 in the shutter slot adjusting member 15ª. The circumferential margin of the flange 73 is arranged opposite an inner annular shoulder 77 of the intermediate member 74 and when the shutter tensioning knob 4 is moved axially upwardly the intermediate annular member 74 is likewise moved axially, because it is engaged by the flange 73. This simultaneously axial movement of the members 4 and 74 is necessary to insure a continuous engagement of the slidable contact member 24ª with the resistance 23. It will be noted that the coupling teeth 75 are considerably longer axially than the projecting portion of the pin 16ª, so that the teeth 75 remain always in engagement with the recesses 76 even though the pin 16ª has been entirely moved out of its corresponding recess 17ª. It is therefore apparent that a relative rotative adjustment between the members 4 and 15ª is possible, while the members 15ª and 74 remain always in the same angular position with respect to each other.

Fig. 7 shows that the shutter speed scale 78 is arranged on the outer circumference of the intermediate annular member 74 while the indicating mark 80 cooperating with this scale is arranged on the knob 4 as in the first embodiment.

The slidable contact member 24ª is attached to a carrier 81 which is rotatably mounted on an annular shoulder 82 of the knob 4 and maintained thereon by a collar 83. The carrier 81 is provided with a downward extension 84 provided at its lower end with a groove 85 for receiving slidably a pin 86 attached on the upper face of a semi-circular control lever 87 at one end thereof. The control lever 87 is pivotally attached between its ends at 89 to the upper face of the flange 73 and at its other end is provided with a cam follower 88 which engages the inner face of an annular cam 90 (Fig. 8) preferably integrally formed with the intermediate annular member 74 or rigidly attached thereto. The inner face 91 of the annular cam 90 is of such configuration (see Fig. 8) that upon adjustment of the shutter speed from one scale division to the next the slidable contact member 24ª is caused to move in uniform angular steps, thereby adjusting the resistance 23 uniformly even though the shutter speed scale on the member 74 is non-uniform.

In other respects the last described modification is constructed and operated in the same manner as explained in connection with the first embodiment, similar parts being provided with the same reference characters in both embodiments. In both embodiments a further resistance 92 (Fig. 10), is included in the circuit of the photoelectric cell and the measuring instrument, which resistance is varied by adjusting the diaphragm opening. Whether the diaphragm opening or the shutter speed is first adjusted depends upon the diaphragm opening or the shutter speed being given.

What I claim is:

1. In a photographic camera, the combination of a curtain shutter, a photoelectric exposure meter provided with an electrical resistance and a slidable contact member thereof, a shutter speed adjusting member, a shutter slot adjusting member, means for releasably coupling said two members for simultaneous rotative movement at different angular positions with respect to one another, one of said members supporting said electrical resistance and the other of said members having said contact member attached thereto.

2. In a photographic camera, the combination of a curtain shutter, a photoelectric exposure meter provided with an electrical resistance and an adjustable contact member thereof, a shutter speed adjusting member, a shutter slot adjusting member, said two adjusting members being rotatable about the same axis, means for releasably coupling said two adjusting members together at different relative angular positions, one of said adjusting members supporting said electrical resistance and the other one of said adjusting members having said contact member attached thereto.

3. In a photographic camera, the combination of a curtain shutter, a photoelectric exposure meter provided with an electrical resistance and an adjustable contact member therefor, a shutter speed adjusting member, a shutter slot adjusting member, said two adjusting members being rotatable about the same axis, means for releasably coupling said two adjusting members together at relatively different angular positions for simultaneous rotation, one of said adjusting members having said electrical resistance attached thereto and the other one of said adjusting members having said contact member rigidly secured thereto, whereby said contact member is adjusted along said resistance whenever said two shutter adjusting members are angularly adjusted with respect to each other.

4. In a photographic camera, the combination of a curtain shutter, a photoelectric exposure meter provided with an electrical resistance and an adjustable contact member therefor, a shutter speed adjusting member adapted for tensioning the shutter, a shutter slot adjusting member, said two adjusting members being rotatable about the same axis, means for releasably coupling said two adjusting members together at different relative angular positions for simultaneous rotation, one of said adjusting members supporting said electrical resistance and the other one of said adjusting members having said contact attached thereto.

5. In a photographic camera, the combination, a curtain shutter, a photoelectric exposure meter provided with an electrical resistance and means for varying the same, shutter speed adjusting means, shutter slot adjusting means, means for coupling said two last named adjusting means at different relative angular positions for simultaneous movement, one of said adjusting means supporting said electrical resistance and the other one of said adjusting means having said resistance varying means attached thereto.

6. In a photographic camera, the combination, a curtain shutter, a photoelectric exposure meter provided with an electrical resistance and means for varying the same, shutter speed adjusting means adapted for tensioning said shutter, shutter slot adjusting means, means for coupling said two last named adjusting means at different relative angular positions for simultaneous movement, one of said adjusting means supporting said electrical resistance and the other one of said adjusting means having said resistance varying means attached thereto.

7. In a photographic camera, the combination, a curtain shutter, a photoelectric exposure meter provided with an electrical resistance and means for varying the same, shutter speed adjusting means, shutter slot adjusting means, said two adjusting means being rotatable about the same axis, means for coupling said two last named adjusting means at different angular positions with respect to each other for simultaneous rotation, one of said adjusting means supporting said electrical resistance and the other one of said adjusting means having said resistance varying means attached thereto.

8. In a photographic camera, the combination of a curtain shutter, a photoelectric exposure meter provided with an electrical resistance and an adjustable contact member associated therewith, a rotatable shutter speed adjusting member, a shutter slot adjusting member rotatably supported by said shutter speed adjusting member, means for releasably coupling said two adjusting members together at different relative angular positions for simultaneous rotation, spring means for urging said adjusting members into coupling engagement, said shutter speed adjusting member being axially movable against the action of said spring means for disengaging said coupling means, one of said adjusting members having said resistance mounted thereon and the other one of said adjusting means having said contact member secured thereto, whereby said resistance is varied whenever said adjusting members are adjusted angularly with respect to each other.

9. In a photographic camera, the combination of a curtain shutter, a photoelectric exposure meter provided with an electrical resistance and a contact member for varying said resistance, a rotatable shutter speed adjusting member, a shutter slot adjusting member rotatable on said shutter speed adjusting member, means for releasably coupling said two adjusting members together at different relative angular positions, an annular shutter speed indicating member connected non-rotatably with said shutter slot adjusting member, said electrical resistance being mounted between said two adjusting members on said annular shutter speed indicating member, and said contact member being supported by said shutter speed adjusting member in slidable engagement with said resistance.

10. In a photographic camera, the combination of a curtain shutter, a photoelectric exposure meter provided with an electrical resistance and a contact member for varying said resistance, a rotatable shutter speed adjusting member, a shutter slot adjusting member rotatable on said shutter speed adjusting member, means for releasably coupling said two adjusting members together at different relative angular positions, an annular shutter speed indicating member connected non-rotatably with said shutter slot adjusting member and provided with a non-uniform shutter speed scale, said electrical resistance being mounted between said two adjusting members concentrically on said annular shutter speed indicating member, and said contact member being supported by said shutter speed adjusting member in slidable engagement with said resistance, and means for varying said resistance uniformly when said shutter speed adjusting member is moved from one scale division of said shutter speed scale to the next one.

11. In a photographic camera, the combination of a curtain shutter, a photoelectric exposure meter provided with an electrical resistance and a contact member for varying said resistance, a rotatable shutter speed adjusting member, a shutter slot adjusting member rotatable on said shutter speed adjusting member, means for releasably coupling said two adjusting members together at different angular positions relatively to each other, an annular shutter speed indicating member connected non-rotatably with said shutter slot adjusting member and provided with a non-uniform shutter speed scale, said electrical resistance being mounted between said two adjusting members on said annular shutter speed indicating member, and said contact member being supported by said shutter speed adjusting member in slidable engagement with said resistance, and means arranged between said shutter speed adjusting member and said shutter slot adjusting member for moving said contact member in uniform steps along said resistance when said shutter speed adjusting member is moved successively from one scale division of said shutter speed scale to the next one.

12. In a photographic camera, the combination of a curtain shutter, a photoelectric exposure meter provided with an electrical resistance and a contact member for varying said resistance, a rotatable shutter speed adjusting member, a shutter slot adjusting member rotatable on said shutter speed adjusting member, means for releasably coupling said two adjusting members together at different angular positions relatively to each other, an annular shutter speed indicating member connected non-rotatably with said shutter slot adjusting member and provided with a non-uniform shutter speed scale, said electrical resistance being mounted between said two adjusting members on said annular shutter speed indicating member, and said contact member being rotatably supported by said shutter speed adjusting member in slidable engagement with said resistance, and means for varying said resistance uniformly when said shutter speed adjusting member is moved from one scale division of the shutter speed scale to the next one, said means including a cam on said annular shutter speed indicating member, a lever pivotally mounted on said shutter speed adjusting member and engaging with one of its ends said cam, and means operatively connecting the other end of said lever with said contact member.

13. In a photographic camera, the combination of a curtain shutter, a photoelectric exposure meter provided with an electrical resistance and a contact member for varying said resistance, a rotatable shutter speed adjusting member, a shutter slot adjusting member rotatable on said shutter speed adjusting member, means for releasably coupling said two adjusting members together at different angular positions relatively to each other, an annular shutter speed indicating member connected non-rotatably with said shutter slot adjusting member and provided with a non-uniform shutter speed scale, said electrical resistance being mounted between said two adjusting members on said annular shutter speed indicating member, said contact member being supported by said shutter speed adjusting member in slidable engagement with said resistance, and means arranged between said shutter speed adjusting member and said shutter slot adjusting member for moving said contact member in uniform steps along said resistance when said shutter speed adjusting member is moved successively from one scale division of said shutter speed scale to the next one, said means including a cam on said annular shutter speed indicating member, a lever pivotally mounted on said shutter speed adjusting member and engaging with one of its ends said cam, and means operatively connecting the other end of said lever with said contact member.

14. In a photographic camera, the combination of a curtain shutter, a photoelectric exposure meter provided with an electric resistance and an adjustable contact member associated therewith, a rotatable shutter speed adjusting member, a shutter slot adjusting member rotatably supported by said shutter speed adjusting member, means for releasably coupling said two adjusting members together at different angular positions with respect to each other for simultaneous rotation, spring means for urging said adjusting members into coupling position, said shutter speed adjusting member being axially movable against the action of said spring means for releasing said coupling means, an annular member arranged between said two adjusting members and non-rotatably connected with one of the same, said annular member having said resistance mounted thereon and the other one of said adjusting members having said contact member secured thereto, whereby said resistance is varied whenever said adjusting members are adjusted angularly with respect to each other.

15. In a photographic camera, the combination of a curtain shutter, a photoelectric exposure meter provided with an electric resistance and a contact member for varying said resistance, a rotatable shutter speed adjusting member, a shutter slot adjusting member rotatable on said shutter speed adjusting member, means for releasably coupling said two adjusting members together at different angular positions relatively to each other, spring means for urging said adjusting members into coupling engagement, said shutter speed adjusting member being axially movable against the action of said spring means for releasing said coupling engagement, an annular shutter speed indicating member connected non-rotatably with said shutter slot adjusting member, said electrical resistance being mounted between said two adjusting members on said annular shutter speed indicating member, and said contact member being supported by said shutter speed adjusting member in slidable engagement with said resistance.

16. In a photographic camera, the combination of a curtain shutter, a photoelectric exposure meter provided with an electrical resistance and a contact member for varying said resistance, a rotatable shutter speed adjusting member, a shutter slot adjusting member rotatable on said shutter speed adjusting member, means for releasably coupling said two adjusting members together at different angular positions relatively to each other, spring means for urging said adjusting members into coupling engagement, said shutter speed adjusting member being axially movable against the action of said spring means for releasing said coupling engagement, an annular shutter speed indicating member connected non-rotatably with said shutter slot adjusting member, said electrical resistance being mounted between said two adjusting members on said annular shutter speed indicating member, and said contact member being supported by said shutter speed adjusting member in slidable engagement with said resistance, and means on said shutter speed adjusting member for axially moving said annular shutter speed indicating member whenever said shutter speed adjusting member is axially moved, whereby said slidable contact member remains always in engagement with said resistance.

17. In a photographic camera, the combination of a curtain shutter, a photoelectric exposure meter provided with an electrical resistance and a contact member for varying said resistance, a rotatable shutter speed adjusting member, a shutter slot adjusting member rotatable on said shutter speed adjusting member, means for releasably coupling said two adjusting members together at different angular positions relatively to each other, spring means for urging said adjusting members into coupling engagement, said shutter speed adjusting member being axially movable against the action of said spring means for releasing said coupling engagement, an annular shutter speed indicating member connected non-rotatably with said shutter slot adjusting member and provided with a non-uniform shutter speed scale, said electrical resistance being mounted between said two adjusting members on said annular shutter speed indicating member, and said contact member being supported by said shutter speed adjusting member in slidable engagement with said resistance, and means for varying said resistance uniformly when said shutter speed adjusting member is moved from one scale division of said shutter speed scale to the next one.

18. In a photographic camera, the combination of a curtain shutter, a photoelectric exposure meter provided with an electrical resistance and a contact member for varying said resistance, a rotatable shutter speed adjusting member, a shutter slot adjusting member rotatable on said shutter speed adjusting member, means for releasably coupling said two adjusting members together at different relative angular positions, spring means for urging said members into coupling engagement, said shutter speed adjusting member being axially movable against the action of said spring means for releasing said coupling engagement, an annular shutter speed indicating member connected non-rotatably with said shutter slot adjusting member and provided with a non-uniform shutter speed scale, said electrical resistance being mounted between said two adjusting members on said annular shutter speed indicating member, said contact member being supported by said shutter speed adjusting member in slidable engagement with said resistance, means arranged between said shutter speed adjusting member and said shutter slot adjusting member for moving said contact member in uniform steps along said resistance when said shutter speed adjusting member is moved successively from one scale division of said shutter speed scale to the next one, and means on said shutter speed adjusting member for axially moving said annular shutter speed indicating member whenever said shutter speed adjusting member is axially moved, whereby said slidable contact member remains always in engagement with said resistance.

HEINZ KÜPPENBENDER.